United States Patent
Shukla et al.

(10) Patent No.: US 9,462,042 B2
(45) Date of Patent: Oct. 4, 2016

(54) SYSTEM AND METHOD FOR ENABLING APPLICATION DISCOVERY BY AUTOMATION NEEDS

(71) Applicant: Automation Anywhere, Inc., San Jose, CA (US)

(72) Inventors: Mihir Shukla, San Jose, CA (US); Sridhar Gunapu, Santa Clara, CA (US)

(73) Assignee: TETHYS SOLUTIONS LLC, San Jose, CA (US)

( * ) Notice: Subject to any disclaimer, the term of this patent is extended or adjusted under 35 U.S.C. 154(b) by 374 days.

(21) Appl. No.: 13/925,522

(22) Filed: Jun. 24, 2013

(65) Prior Publication Data

US 2014/0380192 A1  Dec. 25, 2014
US 2016/0219086 A9  Jul. 28, 2016

Related U.S. Application Data

(63) Continuation-in-part of application No. 12/787,469, filed on May 26, 2010, now Pat. No. 8,504,803.

(51) Int. Cl.
| | |
|---|---|
| G06F 3/00 | (2006.01) |
| G06F 3/048 | (2013.01) |
| H04L 29/08 | (2006.01) |
| G06Q 10/06 | (2012.01) |

(52) U.S. Cl.
CPC ............. *H04L 67/10* (2013.01); *G06Q 10/06* (2013.01)

(58) Field of Classification Search
None
See application file for complete search history.

(56) References Cited

U.S. PATENT DOCUMENTS

| | | | | |
|---|---|---|---|---|
| 5,983,001 | A * | 11/1999 | Boughner | G06F 9/45512 714/38.1 |
| 6,496,979 | B1 * | 12/2002 | Chen | G06F 8/61 717/178 |
| 7,246,128 | B2 * | 7/2007 | Jordahl | G06F 17/30601 |
| 7,533,096 | B2 * | 5/2009 | Rice | G06F 17/30979 |
| 7,805,317 | B2 * | 9/2010 | Khan | G01C 21/32 705/1.1 |
| 7,846,023 | B2 * | 12/2010 | Evans | A63F 13/12 463/42 |
| 8,056,092 | B2 * | 11/2011 | Allen | G06F 8/38 719/320 |
| 8,234,622 | B2 * | 7/2012 | Meijer | G06F 8/36 717/104 |
| 8,352,464 | B2 * | 1/2013 | Fotev | G06F 17/30648 707/707 |
| 8,443,291 | B2 * | 5/2013 | Ku | G06F 8/38 715/762 |

(Continued)

*Primary Examiner* — Yongjia Pan
(74) *Attorney, Agent, or Firm* — Joseph R. Carvalko, Jr.; Cara C. Morris (57) ABSTRACT

This invention generally relates to a process, system and computer code for identifying one or more data relationships that exist between and utilized by one or more applications; determining for each data relationship a respective rank based on specific data that associates the two or more user applications; finding applications based on the degree a respective rank has to one or more user applications; categorizing each relationship based on a criteria of the interaction; creating an application wall containing status updates and links to and from other applications related to the one of the one or more user applications; constructing a automation map from the links between the one or more user applications and other applications.

11 Claims, 7 Drawing Sheets

(56) References Cited

U.S. PATENT DOCUMENTS

| | | | |
|---|---|---|---|
| 8,713,003 B2 * | 4/2014 | Fotev | G06F 17/30657 707/707 |
| 8,769,482 B2 * | 7/2014 | Batey | G06F 8/36 717/104 |
| 8,965,905 B2 * | 2/2015 | Ashmore | G06F 11/34 707/748 |
| 9,104,294 B2 * | 8/2015 | Forstall | G06F 3/0481 |
| 2004/0172526 A1 * | 9/2004 | Tann | G06F 9/44547 713/2 |
| 2007/0101291 A1 * | 5/2007 | Forstall | G06F 3/0482 715/805 |
| 2008/0263024 A1 * | 10/2008 | Landschaft | G06F 17/3087 |
| 2009/0037509 A1 * | 2/2009 | Parekh | G06F 9/44526 709/201 |
| 2010/0100605 A1 * | 4/2010 | Allen | H04L 67/125 709/217 |
| 2011/0022578 A1 * | 1/2011 | Fotev | G06F 17/30657 707/706 |
| 2011/0276568 A1 * | 11/2011 | Fotev | G06F 17/30864 707/728 |
| 2012/0124062 A1 * | 5/2012 | Macbeth | G06F 9/445 707/749 |
| 2012/0330940 A1 * | 12/2012 | Caire | G06Q 10/06 707/723 |

* cited by examiner

SYSTEM AND METHOD FOR ENABLING APPLICATION DISCOVERY BY AUTOMATION NEEDS

CROSS-REFERENCE TO RELATED APPLICATIONS

This is a continuation-in-part of and claims the priority benefit under 35 U.S.C. 120 of U.S. patent application Ser. No. 12/787,469 entitled System and Method For Creating and Executing Portable Software, filed May 26, 2010 the entire disclosures of which are hereby incorporated by reference herein.

FIELD OF THE INVENTION

The present invention relates to information technology software process automation that enables a user to find an application or a group of applications that collaborate to perform a given task, such as converting human interaction around a task into an application automation map.

BACKGROUND OF THE INVENTION

End users of Web task, legacy applications, Apple (Apple is a registered trade mark of Apple, Inc.) or Windows (Windows is a registered trade mark of Microsoft Corporation) based operating systems create few automated processes, that is a series of steps that a user desires to execute on a computer (often at pre-defined time or with a click of a button or a mouse). These software processes could be of any type and for any purpose, e.g., business, IT, or requirements to validate software behavior, etc. In some instances, the user desires to create a task, assign properties to the task and to run the task on a local or a remote computer. Prior art technologies require a user to install a resident application or operating system modification to software on each remote computer it desires to run such a process, which is often found to be time consuming, expensive and impractical for a large number of users. One such desirable application is to create tasks, such as to prepare an accounting, tax returns, or other financial records, that require resources that may be remotely located from the local work station, but essential to carrying out an objective. In such cases it is necessary that the local work station have the facilities to search out the needed resources, establish the needed connections, interrogate and then retrieve the information needed by the local work station to complete the task. Unfortunately, a process that achieves this complex series of steps has not until now been available.

Automation Anywhere found at www.automationanywhere.com fulfills a need to create software processes locally, to be run on the local machine or at remote locations. This software product can in part assist in the execution of steps to create an executable procedure or macro to achieve the process of coordinating the disparate requirements of the inventive process disclosed herein. However, the present Automation Anywhere process does not teach the need for nor the solution for a system that allows linking one or more applications or databases to a repository, which can locate or associate other applications. What is needed is a system and method to achieve such an objective.

In addition to making the necessary connection to complete a process, such as an accounting, it is instructive to a user that they see the interactions of the various resources and the relationships between a user's applications and other application. Such visualization would allow the user to employ other applications more efficiently or assist in the discover of other applications a user can derive data from.

SUMMARY OF THE INVENTION

The disclosed invention enables users to read from and write data into their applications and to store the data into application walls as a repository for others to exploit. An automation map is created to present a simple, consistent view of related applications, data and metadata, and the connections between them. One embodiment of the invention is a computer method for graphically displaying information including the steps of: identifying one or more data relationships that exist between and utilized by one or more applications; determining for each data relationship a respective rank based on specific data that associates the two or more user applications; finding applications based on the degree a respective rank has to one or more user applications; categorizing each relationship based on a criteria of the interaction, such as the amount of data or how often an application has been involved in a particular application between the one or more user applications; creating an application wall containing status updates and links to and from other applications related to the one of the one or more user applications; constructing an automation map from the links between the one or more user applications and other applications.

The invention herein also includes searching the automation map for such items as proximity to other applications; displaying a categorization of the plurality of relations from the links between the one or more user applications and other applications according to the criteria, such as proximity to the other applications; displaying each categorization, of the plurality of relations based on the links between the one or more user applications and other applications, as a respective bar that is representative of the number of occurrences of the specific data item contained therein; uniquely coloring each link in the automation map according to common structural characteristics.

Another embodiment of the invention is a method for generating input content for an application or a form resident on a first computer from content existing in local computer or other remote computers including the steps of: extracting data from a first application; saving source field data to a process repository; transforming and transferring data to a second application; saving target field metadata to a process repository until all metadata has been saved; updating the second application network database, said update including: reading source application, target application, source fields, target fields, and if a first application is linked to a second application 2 then updating an application link with a new set of data fields, calculating a ROI and calculating an application cohesion rank; classifying said first and second applications as one of producers, consumers, or orchestrators; and recalculating the ranks.

In another embodiment the method for generating input content for an application or a form resident on a first computer from content existing in local computer or other remote computers includes the steps of recording the process and playing back the process that extracts, data, saves source field data, transforms and transfers data, saves metadata, and updates the network databases.

Another embodiment of the invention is a non-transitory computer-readable medium having stored thereon computer-readable instructions for displaying information including the steps of: identifying one or more data relationships that exist in one or more databases and utilized by one or more user applications; determining for each relationship a respective rank based on specific data that associates the two or more user applications; finding applications based on the degree a respective rank has to the user one or more user applications; categorizing each relationship based on a criteria (e.g., by way of example and not limitation, the amount of data or how the often use has been made of the application) of the interaction between the one or more user applications; creating an application wall containing status updates and links to and from other applications related to the one of the one or more user applications; searching an automation map constructed from the links between the one or more user applications and other applications; (e.g., by way of example and not limitation: proximity); displaying a categorization of the plurality of relations from the links between the one or more user applications and other applications according to the criteria (e.g., by way of example and not limitation: proximity) to the other applications; displaying for each categorization of the plurality of relations from the links between the one or more user applications and other applications as a respective bar that is representative of the number of occurrences of the specific data item contained therein; coloring each display of the plurality of relations from the links between the one or more user applications and other applications that has the same key structural characteristic with a common color that is different from the coloring of the relations of the other key structural characteristics.

Another embodiment of the invention is a non-transitory computer-readable medium having stored thereon computer-readable instructions for generating input content for an application or a form resident on a first computer from content existing in the same computer or one or more remote computers including the steps of: extracting data from a first application; saving source field data to a process repository; transforming and transferring data to a second application; saving target field metadata to a process repository until all metadata has been saved; saving the process; updating the second application network database, said update including: reading source application, target application, source fields, target fields, and if a first application is linked to a second application then updating an application link with a new set of data fields, calculating a ROI and calculating an application cohesion rank; classifying said first and second applications as one of producers, consumers, or orchestrators; and recalculating the ranks.

In yet another embodiment of the invention is a computer system for displaying information including the steps of: for identifying one or more data relationships that exist between and utilized by one or more applications comprising a first processor for determining for each data relationship a respective rank based on specific data that associates the two or more user applications; a second processor for finding applications based on the degree a respective rank has to one or more user applications; a third processor for categorizing each relationship based on a criteria of the interaction; a fourth processor creating an application wall containing status updates and links to and from other applications related to the one of the one or more user applications; a fifth processor for constructing an automation map from the links between the one or more user applications and other applications.

DESCRIPTION OF PREFERRED EMBODIMENT

The present invention will now be described more fully hereinafter with reference to the accompanying drawings, in which preferred embodiments of the invention are shown. This invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. In what follows, application software refers to all the computer software that causes a computer to perform useful tasks beyond the running of the computer itself. For purposes of the disclosure herein a specific instance of such software is called a software application, application or app (spelled APP). The term is used to contrast such software with system software, which manages and integrates a computer's capabilities but does not directly perform tasks that benefit the user. The system software serves the application, which in turn serves the user.

Figure 1A:
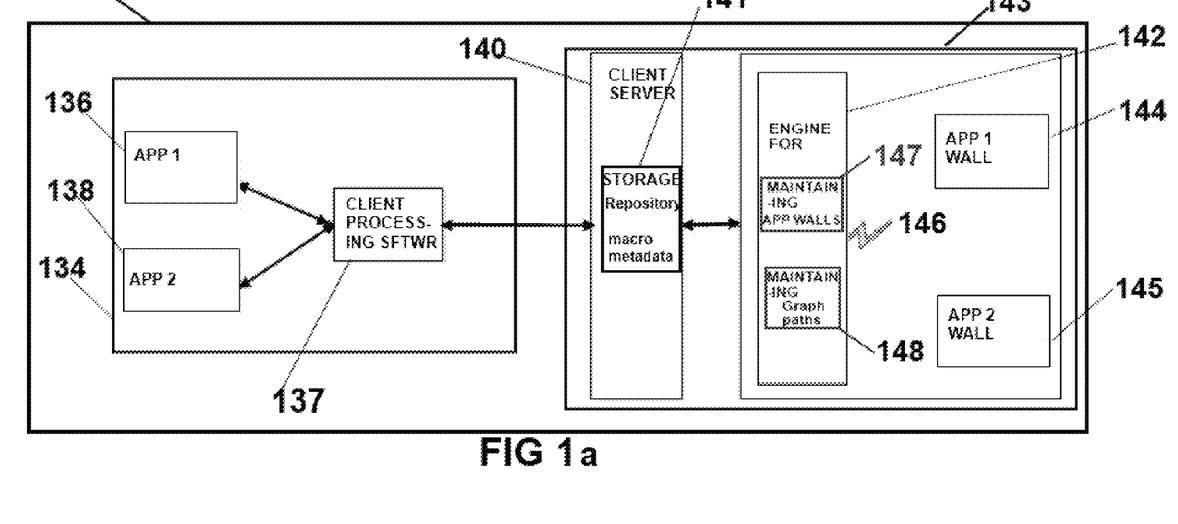
FIG. 1a shows a hardware system for creating and porting one or more portable software execution files in accordance with an embodiment of the present invention.

FIG. 1a represents a system 100 where a user at an origin can create software processes in one computer environment that can be ported to one or more remotely situated computers for obtaining a resource needed to accomplish a task such as by way of example and not limitation, the creation of substance in an accounting spreadsheet. System 100 includes at least one user computer 104 having at least one central processing unit (CPU) 119 which typically is the processor for an operating system and an application resident in memory 121 that contains display 115 and an input device 117 in addition to having the facility to access other computers, such as server 126. The server 126 has at least one central processing unit (CPU) 108 which typically is the processor for an operating system and an application resident in memory 120 that contains a database storage unit 107 and a means for communication 122. The system 100 may further include a plurality of remote computers (not shown) and further by way of example and not limitation, to a plurality of mobile personal data assistants, tablets and smartphones (not shown) that may access the server 126 and operate the processes disclosed herein.

The system 102 may be configured in many different ways. For example, server 126 may be a conventional standalone server computer or alternatively, the function of server may be distributed across multiple computing systems and architectures. Server 126 may also be configured in a distributed architecture, wherein databases and processors are housed in separate units or locations. Some such servers perform primary processing functions and contain at a minimum, a RAM, a ROM, and a general controller or processor. In such an embodiment, each of these servers is attached to communications ports that serve as a communication link with other servers, client or user computers. A variety of communications protocols may be part of the system, including but not limited to: Ethernet, SAP, SAS™, ATP, Bluetooth, GSM and TCP/IP.

Figure 1B:
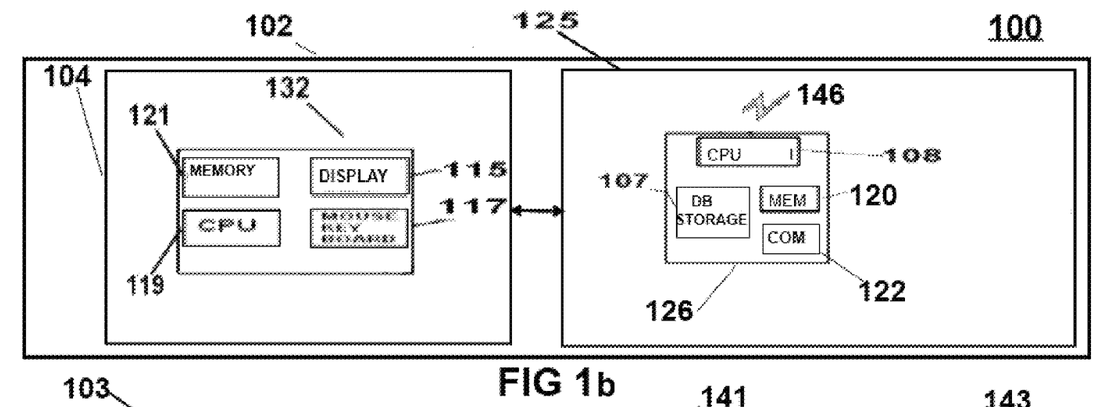
FIG. 1b shows a logical system for creating and porting one or more portable software execution files in accordance with an embodiment of the present invention.

Referring to FIG. 1a and FIG. 1b, a process 103 is executed by system 102. The disclosed invention enables users utilizing computer 104 to read and write data, manually and utilizing an automated process (to be further described below) into applications, such as APP 1, 136 and APP 2 138 and onto APP wall 144 and APP wall 145. By way of further explanation, the functionality in logical unit 143 is contained in server 125 and the functionality contained in logical unit 134 is contained in computer 104. Storage repository 141 resides in database (DB) storage 197. Logical unit 143 maintains 147 the APP 1 wall 144 and APP 2 wall 145 using an engine 142. APP walls are generally considered open to all users on a system. Engine 142 also creates and maintains a process 148 for creating and presenting automation maps which may be simple, consistent views of related APPs and the data, metadata, and the connections between them.

Data storage devices (not shown) within which systems, applications and communications programs as well as databases, such as database 107, may be stored on hard magnetic disk drives, optical storage units, CD-ROM drives, RAM or flash memories by way of example. Data storage devices (e.g., database storage 107) contain databases used in processing the tasks to be further described below and/or calculations in accordance with the present invention, including at least a command structure for application in the construction of macros or tasks as will also later be described in detail. In one embodiment, database software creates and manages these databases. Creation and porting of portable software (such as software to find applications, scrape data from those applications, insert the scraped data into APPs such as APP 1, 136 or APP 2 138, and update APP 1 wall, 144 or APP wall, 145) and bring about related calculations and/or execute algorithms of the present invention are stored in storage device and executed by the CPU 104 in association with server 125. Controllers (not shown) reside in CPU 108 and CPU 119 that comprise processors (not shown), such as one or more conventional microprocessors and one or more supplementary co-processors such as math co-processors. In CPU 108 at least one such processor is in communication with a communication module 122 that transmits data over a port through which the communication module 122 communicates with other devices such as other servers, user terminals or devices and the Internet 146. The communication port may include multiple communication channels for simultaneous communication with, for example, other processors, servers or client terminals.

The data storage device 107 may store, for example, (i) a program (e.g., computer program code and/or a computer program product for creating, executing and porting the portable software, or maintain the APP 1, APP 2, APP 1 wall and APP 2 wall (see, FIG. 1a, FIG. 1b) to direct the processor in accordance with the present invention, and particularly in accordance with the processes described in detail hereinafter with regard to the creating, executing and porting the portable software to achieve the novelty of the invention; (ii) a database adapted to store information that may be utilized to store information required by the program for creating, executing and porting the portable software to achieve the novelty of the invention. The program for creating, executing and porting the portable software may be stored, for example, in a compressed, an uncompiled and/or an encrypted format, and may include computer program code. The instructions of the program, included user generated macros that may include instructions to record and playback executable programs may be read into a main memory of the processor from a computer-readable medium other than the data storage device, such as from a ROM or from a RAM. While execution of sequences of instructions in the program causes the processor to perform the process steps described herein, hard-wired circuitry may be used in place of, or in combination with, software instructions for implementation of the processes of the present invention. Thus, embodiments of the present invention are not limited to any specific combination of hardware and software.

The term "computer-readable medium" as used herein refers to any medium that provides or participates in providing instructions to the processor of the computing device (or any other processor of a device described herein) for execution and more particularly for creating, executing and porting the portable software. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor (or any other processor of a device described herein) for creating, executing and porting the portable software. For example, the instructions may initially be borne on a magnetic disk of a remote computer. The remote computer can load the instructions into its dynamic memory and send the instructions over an Ethernet connection, cable line, or even telephone line using a modem. A communications device local to a computing device (or, e.g., a server, such as communication module 122) can receive the data on the respective communications line and place the data on a system bus for the processor. The instructions received by main memory may optionally be stored in memory either before or after execution by the processor. In addition, instructions may be received via communication module 122 and associated port as electrical, electromagnetic or optical signals, which are exemplary forms of wireless communications or data streams that carry various types of information.

Figure 2A:
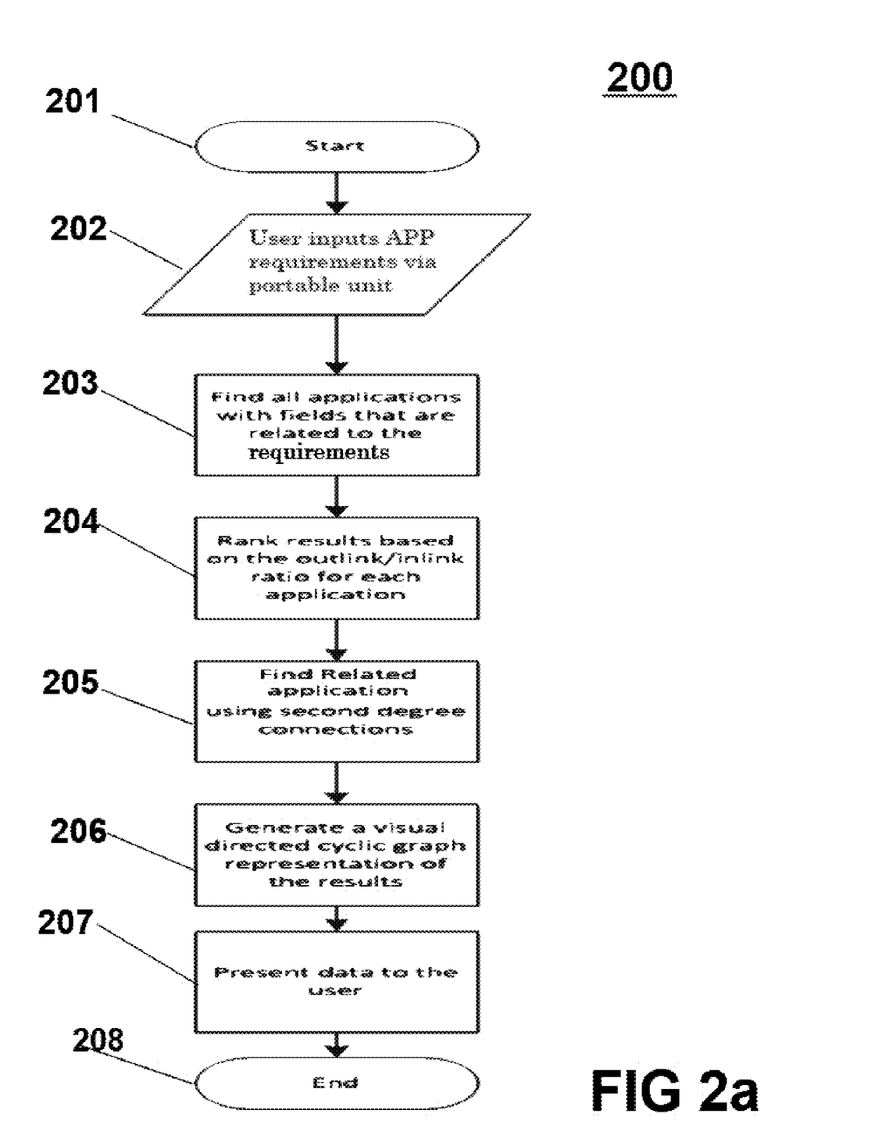
FIG. 2a, shows a flow diagram for the discovery of an application required from completing an application task in accordance with an embodiment of the present invention.
Figure 2B:
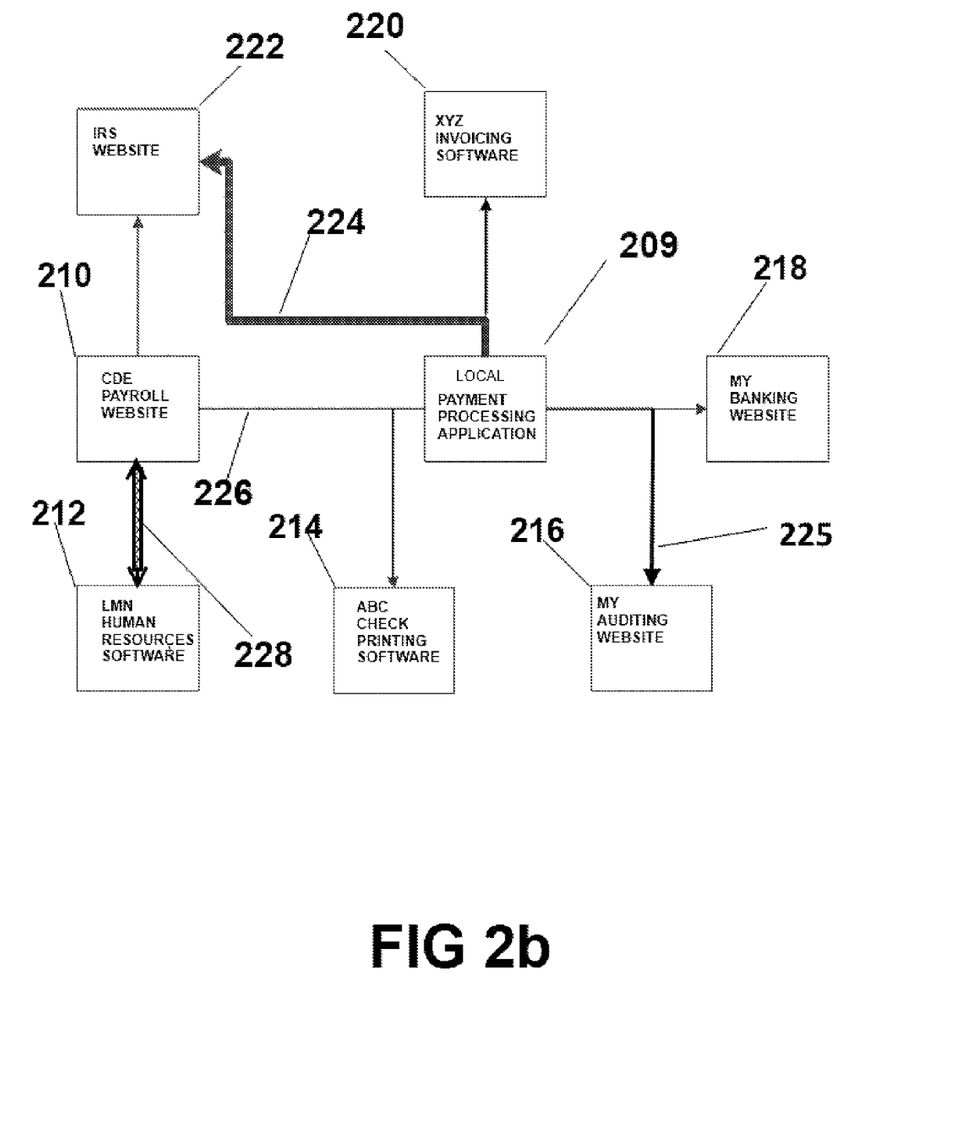
FIG. 2b illustrates a map of the connections made by the system in accordance with an embodiment of the present invention.

FIG. 2a, 2b, and the system 100 (FIG. 1) disclose one embodiment of the invention where a user may desire to identify one or more data relationships that exist between and utilized by one or more APPs or applications; determine for each data relationship required by an APP, a respective rank based on specific data that associates the two or more user applications (e.g., for a given data relationship, the rank may be based on how current by update time the data relationship is) find applications (either within the local computer 104, or more broadly the local system 100, and even within the domain of the Internet) based on the degree a respective rank has to one or more user applications.

With further reference to FIG. 2*a*, 2*b*, and by way of example, a user of the system 100 (FIG. 1) may desire to create a process 200 instantiated as a task to be run at various times or repetitively on the local computer 104 to achieve the foregoing objects. In a browser viewed by the user in display 115, process 200 will permit, as will be further described in connection with FIG. 2*b* through FIG. 5, the user to insert commands having single execution features or as part of a several line operation or one of several commands that may operate as part of a larger loop or nested loop that will have the effect of achieving an outcome such as searching the Internet for sites that have information needed, by way of example and not limitation, for populating a tax return or an accounting balance sheet, i.e., applications as represented schematically in FIG. 1 as APP 1, 136 and APP 2. 138. U.S. patent application Ser. No. 12/787,469 entitled System and Method For Creating and Executing Portable Software, demonstrates the creation of commands having single execution features or as part of a several line operation or one of several commands known as a portable unit that will facilitate the construction of the inventive features of the process 200.

An embodiment of the present invention is that the system 100, utilizing process 200, generates an automation map shown in FIG. 2*b*, from the links between the one or more user applications and other applications. In the example shown in FIG. 2*b*, a portable unit launched over the Internet has found several sites that will achieve the goal of retrieving information needed to accomplish the task represented as represented in FIG. 1 as APP 1, 136 and/or APP 2, 138. Based on the foregoing, one embodiment of the invention includes the creation of a portable unit that includes at least one new task file with tasks having commands and inputs relevant to the APP 1 and/or APP2 requirements 202. In the example illustrated in the flow chart, FIG. 2*a*, the portable unit contains an execution file that directs it to find 203 all applications with fields that are related to the requirements and to retrieve at the site so located the same requirements. It is anticipated that over time users may determine other examples related to the requirements. Upon finding the applications 203 the process 200 ranks 204 the results based on the outlink/inlink ratio. Inlink in this instance is the number of specified fields the application consumes. The outlink is the number of specified fields the application produces. An application is a more reliable source for the data fields than a user may be interested in if it is a net producer of those fields. This is one example of a ranking. The process 200 then finds 205 related application using second degree connections. For example, 212 is a second degree for application 222. This metric highlights the fact that there are multiple steps or APPs between the current application and the source application. This could mean changing the connection map by changing the steps to either passing along the required fields or making a direct connection from 222 to 212. In step 206, process 200 generates the automation map illustrated in FIG. 2*b* and presents the results 207 in display 115. By way of example, the automation map FIG. 2*b*, has a series of connecting lines that emanate from a local Payment Processing Application 209 resident on computer 104 (FIG. 1*a*) and touch each application found for example to have relevance to achieving the task of completing the requirements for APP 1. The thickness of the lines, such as seen in reference lines, 224, 225, and 226 signify the number of fields involved in the data that is being returned, as for example My Automation Website 216, XYZ Invoice Software 220, and ABC Check Printing Software 214. The number of fields reflects the impedance mismatch between the two applications used in this example. The more fields needed to be transferred, the larger the communication/integration or automation gap. The IRS Website line 224 is thicker than the other lines depicted in the automation map indicating that the information found at IRS Website 222 contains a greater number of fields of information, and therefore, more information than the other sites. The hashed line 228 (although any color or other denotation may be used) between site 210 and 212 indicates a qualitative measure of the time saved in the automated process versus acquiring the data offered by this connection though manual means.

Having found the applications and or application/sites using process 200 (FIG. 2*a*), an embodiment of the invention herein carries out a recording process 300*a* to capture and record events. The process start 320 initiates the launch of the recorder APP, where a user is queried to enter process information 324. The user initiates the start of the process 326 upon entering the information, whereby the process 300 attaches system event listeners (e.g., these are subroutines running in the background to capture key strokes, mouse events, etc.) and captures user generated events 328. In step 330 the process 300 captures process context, until the user indicates the process end 332. A this point the process 300*a* causes the system 100 to compute an automation map 334. Process 300*a* then saves the automation map to a database and ends the capture event process. Process 300*a* Step 334 also proceeds to execute step 340 to identify data source events (e.g., application used to execute a "cut" operation in word processor to extract a portion of a document) and step 342 identify data input events (e.g., the actual paste event in a word processor document). Based on the information acquired in steps 340 and 342 the process 300*a* classifies the APP as intermediate, producer or consumer. For example an intermediate APP might be a spreadsheet application such as Microsoft Excel that plays no essential or critical role in performing the process or the task. In step 348 process 300 tests if intermediate APPs are present and if so then it removes 350 the intermediate APPs and links the producer directly to the consumer. If and when no intermediate APPs are present then the processor builds or updates the automation map 352. The process 300 in step 354 pre calculates edge weights (e.g., field count, amount of data flowing, location events) and computes APP cohesion index for all APP pairs 356 before ending the process 358.

Figure 3A:
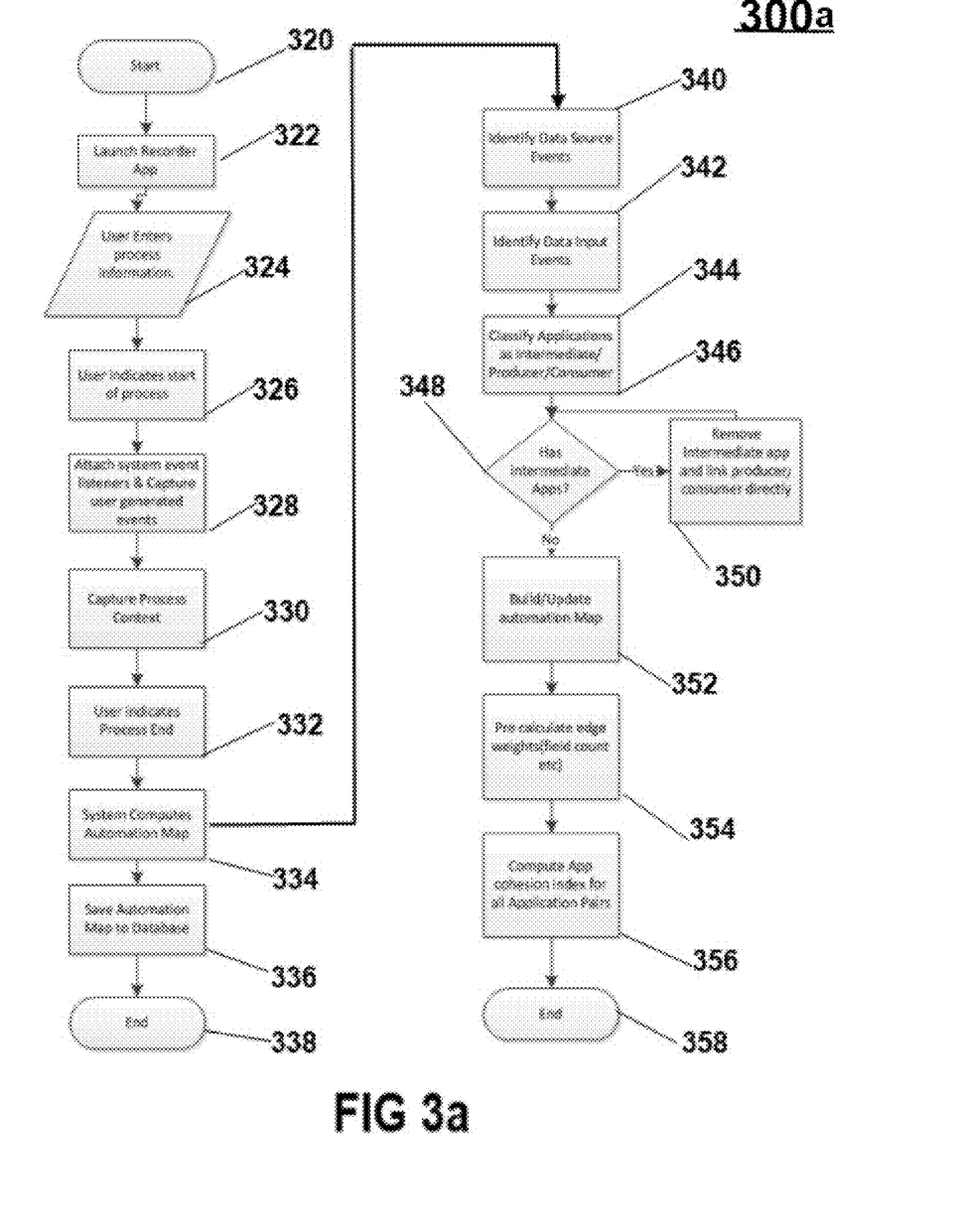
FIG. 3a shows a flow diagram of the recording of an execution files in accordance with an embodiment of the present invention.
Figure 3B:
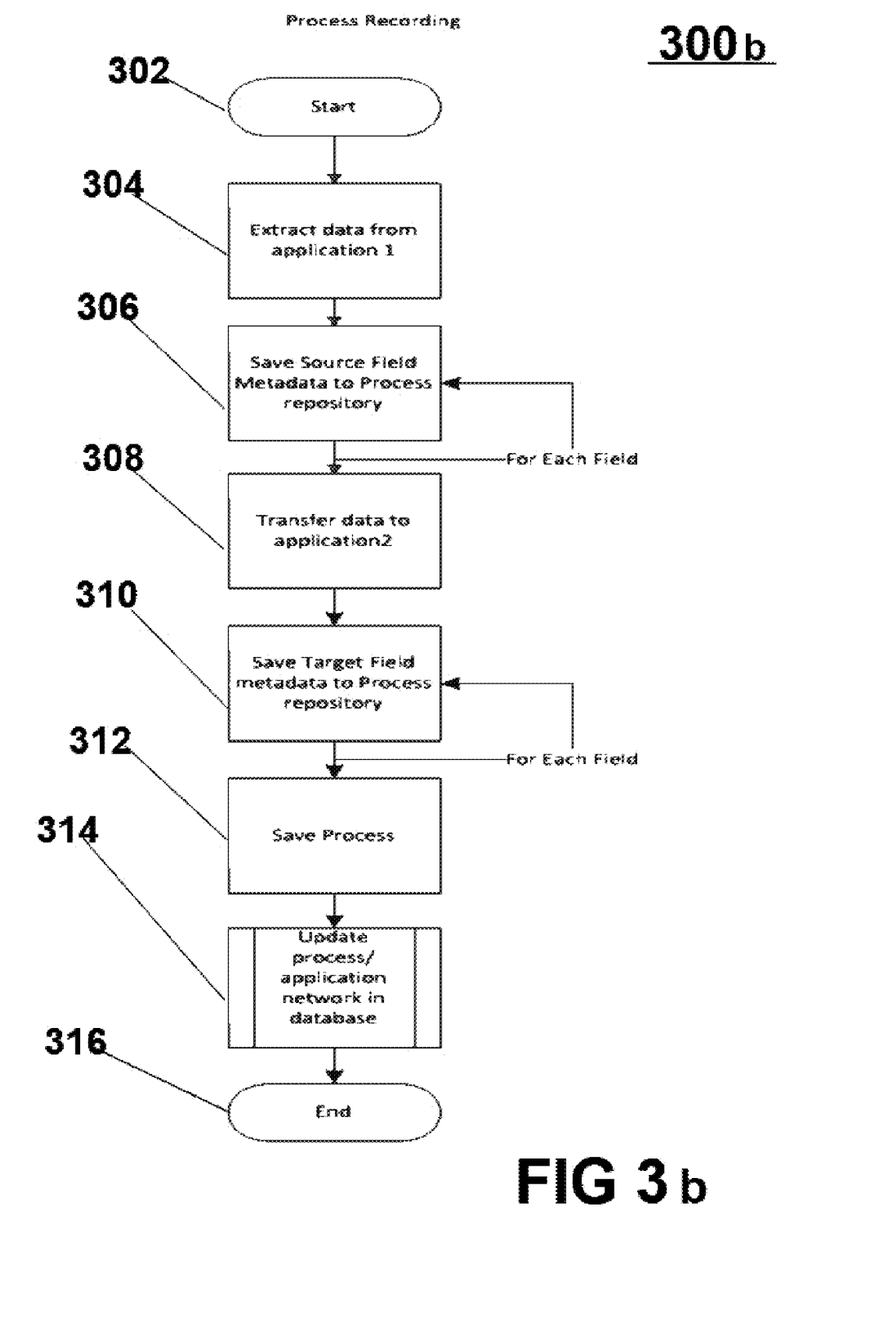
FIG. 3b shows a flow diagram of the recording of an execution files in accordance with an embodiment of the present invention.

A portion of an embodiment of the invention shown in FIG. 3*b*, process expands in steps 304, 306, 308 and 310, the operation that takes place in step 328 (FIG. 3*a*). Similarly FIG. 3*b*, steps 312 through 314 expand on FIG. 3*a* steps 334, 336. Finally FIG. 3*b*, steps 312 through 314 embody the steps 340, 342, 344, 346, 348, 350, 352, 354, and 356. By way of further explanation assume that APP 1, 136 contains information required by APP 2, 138, then step 304 extracts data from APP 1, and in step 306, process 300*b* saves the source field metadata to a process storage repository 141, located in server 143 (FIG. 1*b*). The step 306 is repeated until all the data from APP1 relevant to APP 2 is saved in the repository. In step 308 the process 300*b* transfers the metadata stored in the repository 141 and transforms it so as it is in the proper form and format to be used by APP 2. In step 310, the process saves the target field metadata to the process repository 141. The step 310 is repeated until all the data relevant to target field metadata is saved in the repository 141.

In step 314 the process 300 saves 312 the process executed in steps 304, 306, 308, and 310 to have available for future use. In step 314, the process 300b updates the process/application network database and either creates an APP wall (144,145) or updates the APP wall (144,145) for the user and other users to resource. The process essentially updates status and updates or creates links to and from other applications related to the one of the one or more user applications to reflect the changes made in the execution of steps 304, 306, 308, and 310.

Figure 4:
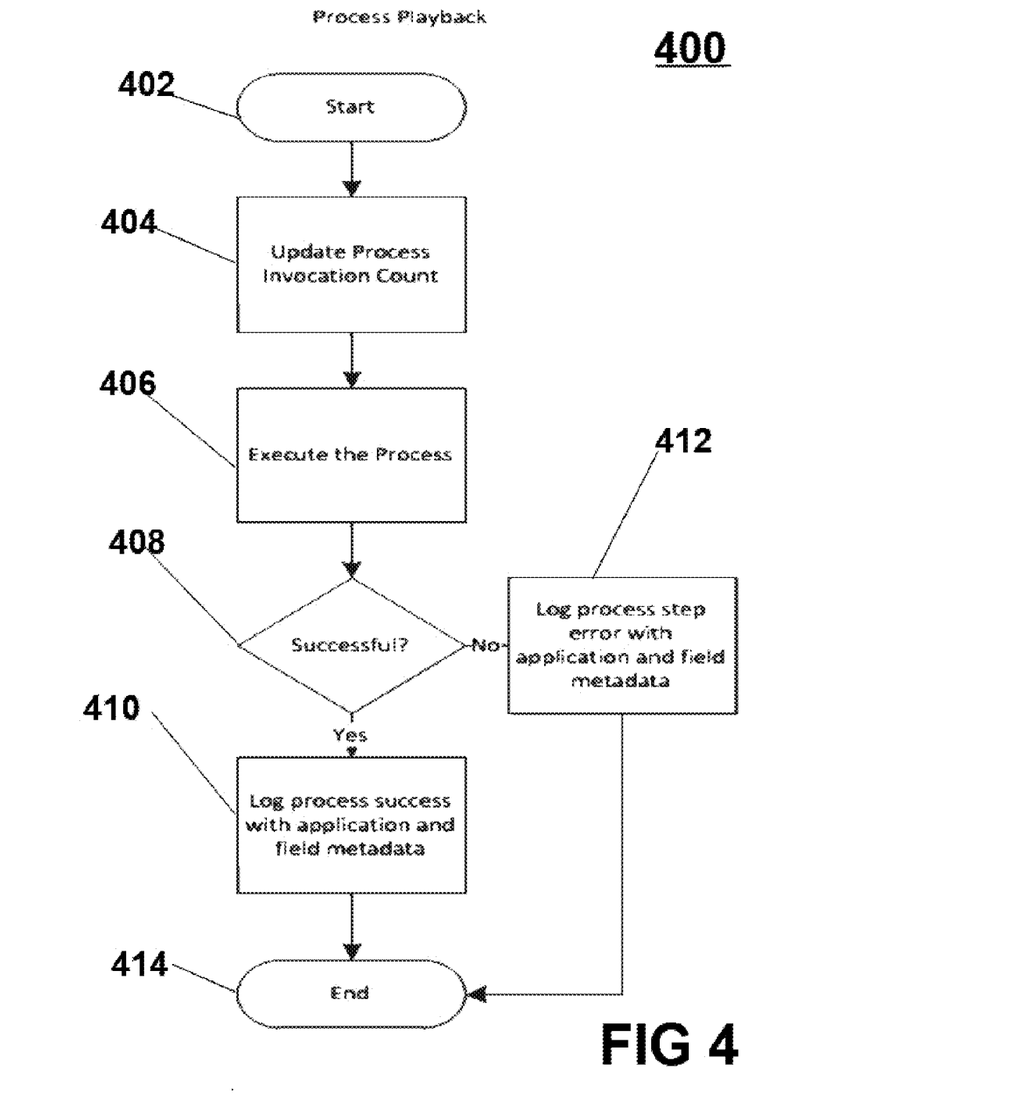
FIG. 4 shows a diagram for the playback of an execution file in accordance with an embodiment of the present invention.

Having stored the relevant metadata and target field metadata the applications, we turn to FIG. 4, an embodiment of the invention herein that carries out process 400, which has the ability to playback the process stored in during process 300a and process 300b. In step 404 process 400 updates the invocation count, 404. The invocation count is used during visualization and analytics to optimize the user interaction (e.g., the higher the count, more it signals that the step should be automated at an API level to make it seamless to the end user. In step 406, process 400 executes the process (such as the process stored in during processes 300a and 300b). Having executed the process the process 400 tests 408 if the execution was successful, and if not proceeds to step 412, where it logs the process step containing the error with the application and field metadata and ends 414 process 400. If the execution in step 406 was successful, then in step 410, the log process indicates a success with the application and field metadata.

Figure 5:
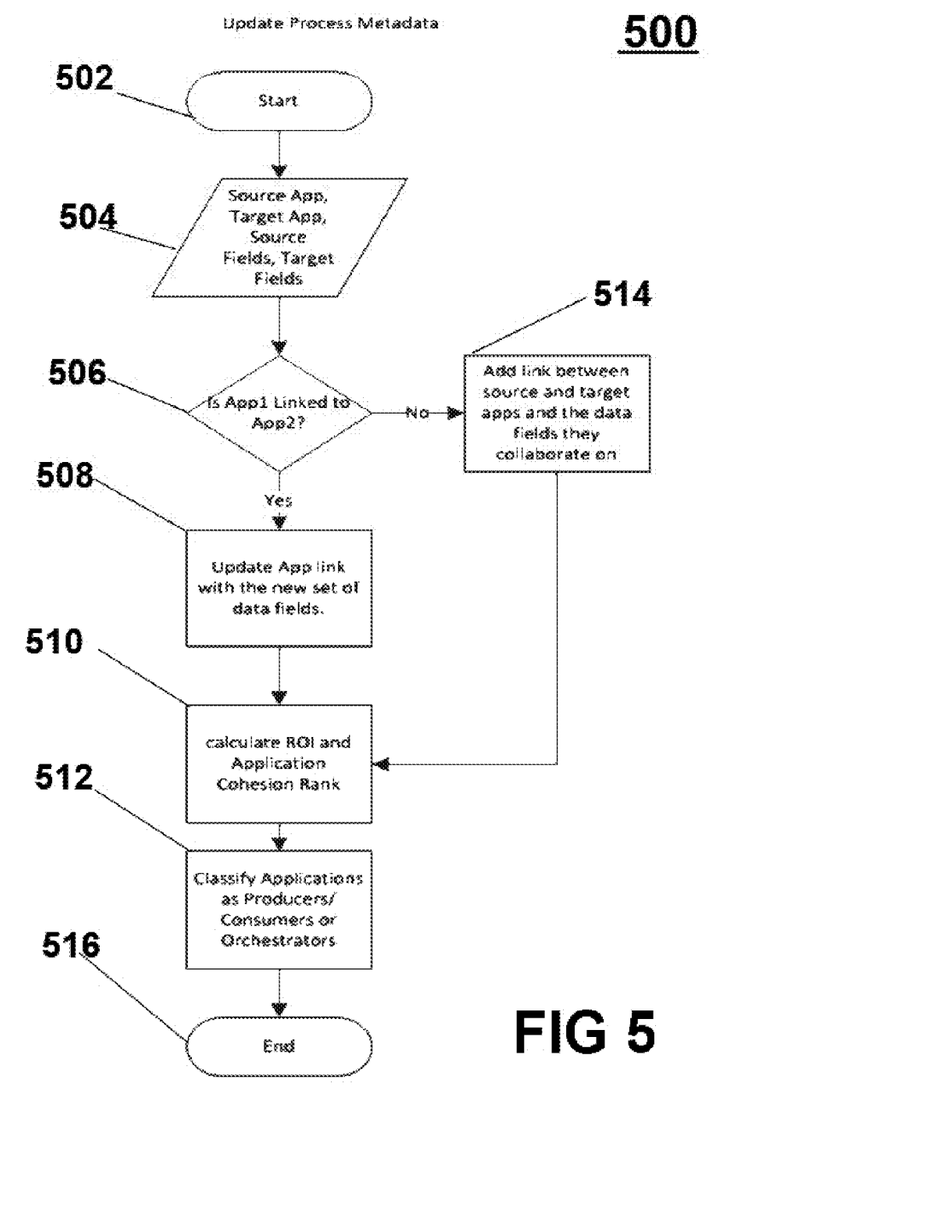
FIG. 5 shows a flow chart for the updating of the process metadata used by the executable execution files in accordance with an embodiment of the present invention.

FIG. 5 is an embodiment of the invention where the system 100 updates the metadata collection process starting 502 with a process 500 that retrieves 504 the source application, the target application and the source application field data and the target field data. In step 506, the process 500 determines if by way of example and not limitation, APP 1, 136 (FIG. 1b) is linked to APP 2, 138 (FIG. 1b). If it is determined it is not, then step 514 adds a link between the source and the target APPS (e.g., APP 1 and APP 2) as well as to the data fields they the two related APPS collaborate on, and proceeds to step 510. If the APP 1 is linked to APP 2, then step 508 updates the APP link with the new set of data fields.

In one embodiment of the invention process 500 categorizes each relationship based on a criterion of the interaction. To this end, in step 510, process 500 calculates an ROI (Return On Investment.) The ROI is a index of how much value (generally denominated in a currency) is saved or could be saved by eliminating or optimizing a process step. The system can predict and provide historical values to make task automation suggestions. An application cohesion rank is a computed numeric value, whereby given two applications the system computes: (sum of fields directly or indirectly sourced from each other) times (the weighted distance between them). One application of this is the APP pairs with higher cohesion index are candidates for process optimization. In step 512 process 500 classifies applications as producers, consumers and orchestrators.

While the foregoing invention has been described with reference to the above embodiments, additional modifications and changes can be made without departing from the spirit of the invention. Accordingly, such modifications and changes are considered to be within the scope of the appended claims.

I claim:

1. A computer method comprising the steps of: executing one or more programs resident at one of a local or remote computer site, said programs instantiating a task to be run at various times or repetitively at one of the local or remote computer site; identifying one or more data relationships that exist between and utilized by one or more applications at one of the local or remote computer site; determining for each data relationship a respective rank associated with the one or more applications; launching a portable unit containing an execution file that directs it to find all applications with fields that are related to the relationships; retrieving at any site located, the relationships based on the degree the respective rank, based on an outlink/inlink ratio, has to the one or more applications, wherein the outlink/inlink includes a number of fields an application consumes or produces; categorizing each relationship based on a criteria of the interaction; creating an application wall containing status updates and links to and from applications related to the one of the one or more applications; constructing an automation map from the links between the one or more applications.

2. The computer method as in claim 1 further including searching the automation map for parameters that relate the one or more applications to other applications.

3. The computer method as in claim 1 further including displaying a categorization of the plurality of relationships from the links between the one or more applications and other applications according to the criteria.

4. The computer method as in claim 1 further including displaying each categorization of the plurality of relations based on the links between the one or more applications and other applications, as a respective bar that is representative of the number of occurrences of the specific data item contained therein.

5. The computer method as in claim 1 further including coloring each link in the automation map according to common structural characteristics.

6. The computer method as in claim 1, the number of fields between two applications reflects an impedance.

7. A non-transitory computer-readable medium having store thereon computer-readable instructions for: executing one or more programs on one or more programs on one or more local or remote computers, said programs identifying one or more data relationships that exist between and utilized by one or more applications resident on one or more local or remote computers; determining for each data relationship a respective rank based on specific data that associates the two or more user applications; launching a portable unit containing an execution file that directs it to find all applications with fields that are related to the requirements; retrieving at any site located, the same requirements based on the degree a respective rank, based on an outlink/inlink ratio, has to one or more user applications, wherein the outlink/inlink includes a number of fields an application consumes or produces; categorizing each relationship based on a criteria of the interaction; creating an application wall containing status updates and links to and from other applications related to the one of the one or more user applications; constructing an automation map from the links between the one or more user applications and other applications.

8. The non-transitory computer-readable medium in claim 7 further including stored thereon computer-readable instructions for searching the automation map for parameters that relate the one or more user applications and other applications.

9. The non-transitory computer-readable medium in claim 7 further including stored thereon computer-readable instructions for displaying a categorization of the plurality of relations from the links between the one or more applications and other applications according to the criteria.

10. The non-transitory computer-readable medium in claim 7 further including stored thereon computer-readable instructions for displaying each categorization of the plurality of relations based on the links between the one or more applications and other applications, as a respective bar that is representative of the number of occurrences of the specific data item contained therein.

11. The non-transitory computer-readable medium in claim 7 further including stored thereon computer-readable instructions for coloring each link in the automation map according to common structural characteristics.

* * * * *